Jan. 18, 1949.    J. J. BLACK    2,459,766
TRAILER BODY CONSTRUCTION
Filed April 13, 1944    2 Sheets-Sheet 1
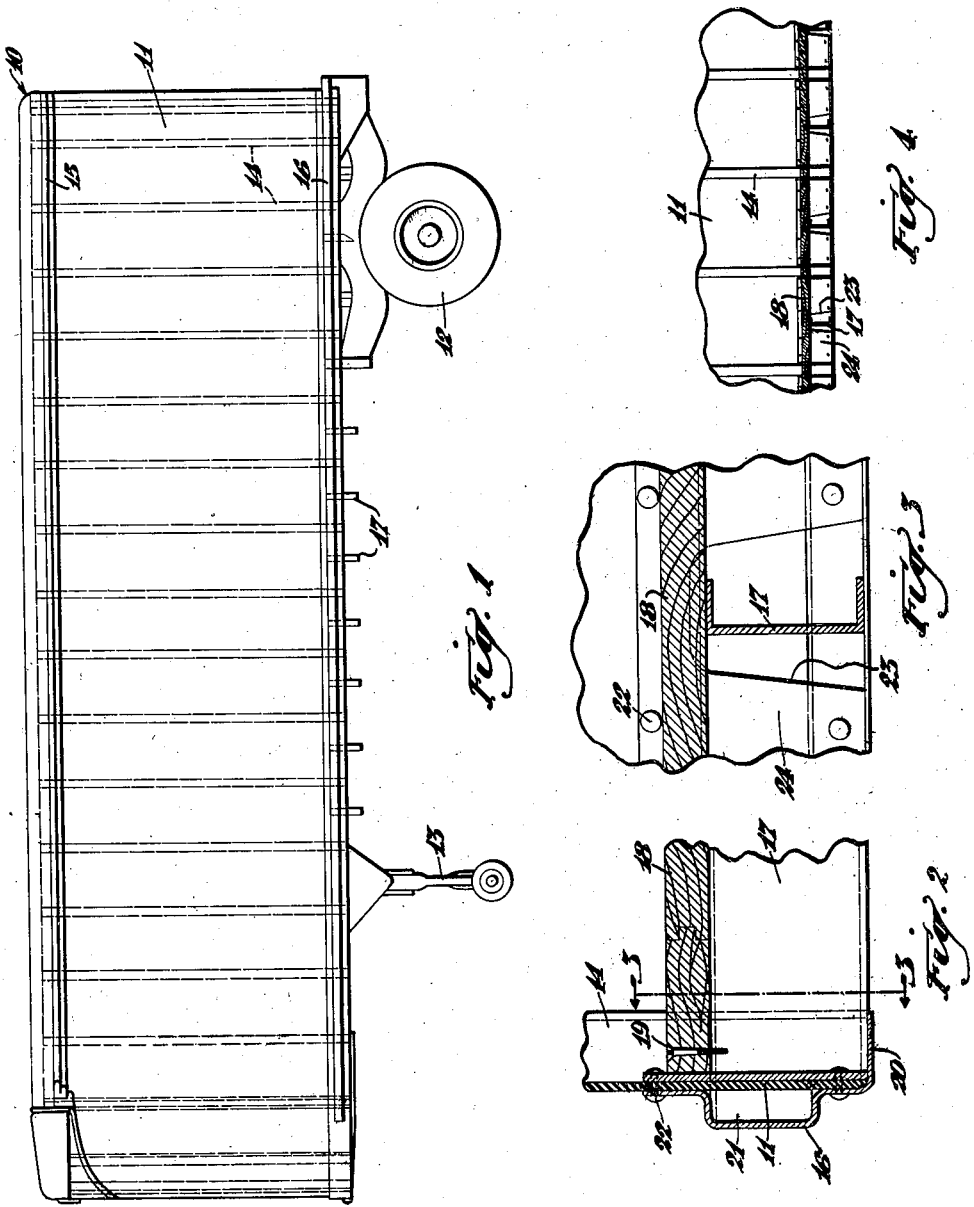
INVENTOR.
James J. Black
BY Wood, Arey, Herron & Evans
Attorneys Jan. 18, 1949.   J. J. BLACK   2,459,766
TRAILER BODY CONSTRUCTION
Filed April 13, 1944   2 Sheets-Sheet 2
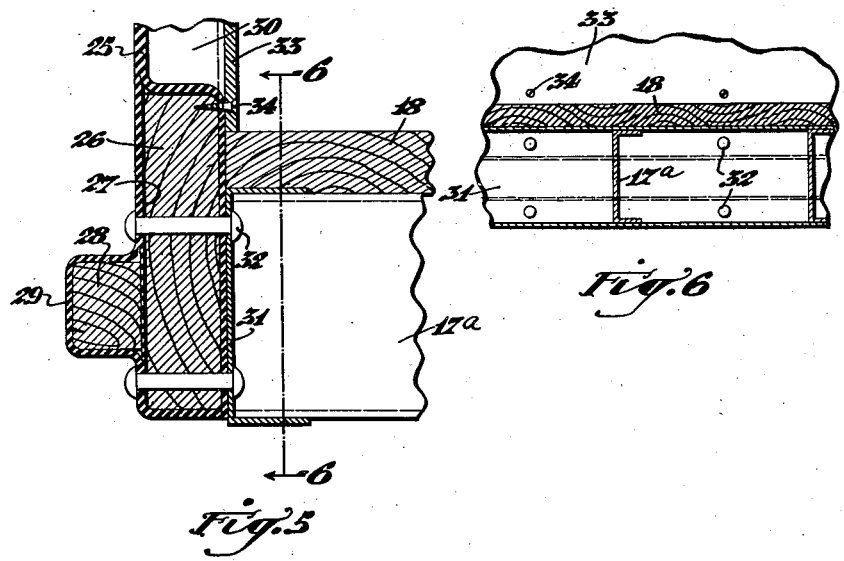
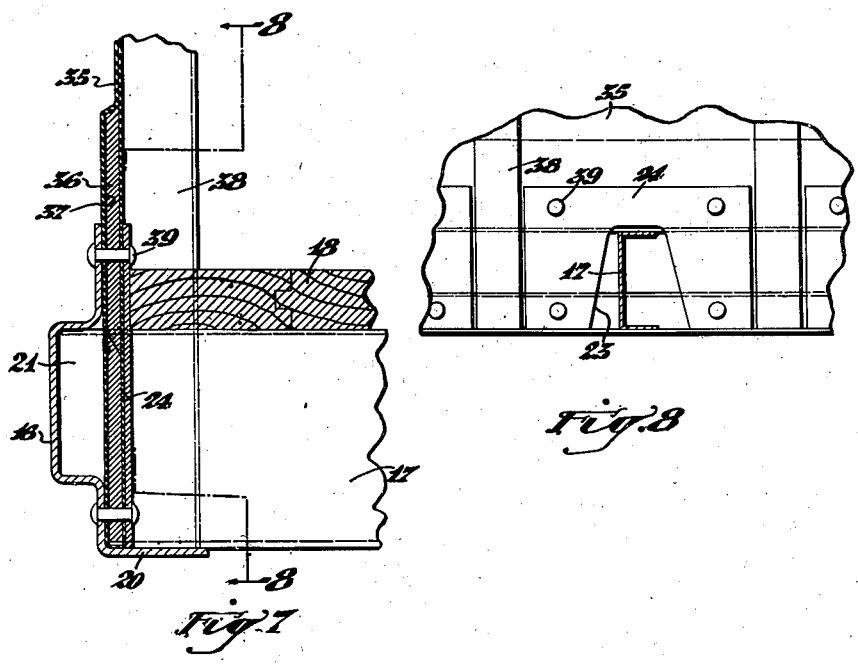
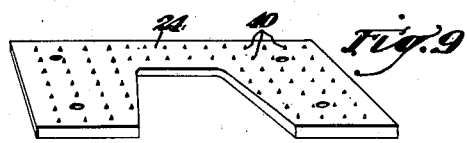
INVENTOR.
James J. Black
BY
Wood, Arey, Herron & Evans
Attorneys.

Patented Jan. 18, 1949

2,459,766

UNITED STATES PATENT OFFICE 2,459,766

TRAILER BODY CONSTRUCTION

James J. Black, Cincinnati, Ohio, assignor to The Trailmobile Company, a corporation of Delaware Application April 13, 1944, Serial No. 530,852

5 Claims. (Cl. 296—28)

This invention relates to the construction of bodies for trailers and similar highway vehicles, particularly those of the closed type. The invention is primarily concerned with the construction of the lower portion of the side walls of a trailer body and the means provided for maintaining the rigidity of the side walls with respect to the floor and bolsters.

In my copending application Serial No. 530,851, filed April 13, 1944, entitled "Trailer body side wall constduction" I have disclosed a trailer body construction in which the side walls of the body are formed substantially from sheets of plastic material preferably laminated and reinforced by bracing members inserted in the corrugations and between the laminations of the sheets. The present invention is also concerned with the utilization of this type of body wall construction but is particularly directed to the provision of means for reenforcing the side wall panels in the area adjacent the floor of the vehicle. Inasmuch as the wall panels of the type disclosed in my copending application if not reenforced and braced might lack the rigidity necessary for use in vehicle construction and the reenforcement provided by the vehicle corrugations and posts enclosed therein is necessarily terminated at the floor line of the vehicle, additional and novel support means have been provided in this general area and particularly beneath the floor line in order to complete a body construction which will be sufficiently resistant to the shocks and strains incident to the rough wear to which vehicles of this type are subjected.

One of the objects of the present invention has been to provide a construction in which the side wall panels, preferably formed of corrugated plastic sheets, may be extended to a point substantially below the floor line of the vehicle and reenforced and supported over the extended area.

Another object has been to provide means for utilizing the bolsters conventionally used in a trailer body construction in combination with an extension of the vehicle side wall beneath the floor line to provide a strong and substantially unitary construction at this point.

Another object has been to provide means for reenforcing and bracing the inner surface of a trailer body side wall formed from corrugated plastic sheets in the area in which the side wall has been extended below the floor line of the vehicle body.

Another object has been to provide means for obtaining a particularly tight and secure engagement between reenforcing metal plates and plastic sheets in connection with the particular construction to which the invention relates.

Other objects and advantages will be apparent from the further and more detailed description of the invention when considered in conjunction with the drawings in which:

Figure 1 is a side elevation of a completed trailer body in which the inventions of the present application have been embodied.

Figure 2 is a sectional view of the lower edge of the side wall of the body illustrated in Figure 1 at a central point along the body wall.

Figure 3 is a sectional view along the line 3—3, Figure 2.

Figure 4 is a view similar to Figure 3 except that it includes a larger longitudinal area of the lower edge of the side wall.

Figure 5 is a sectional view similar to Figure 2 illustrating a modified form of construction.

Figure 6 is a sectional view along the line 6—6, Figure 5.

Figure 7 is a sectional view similar to Figures 2 and 5 illustrating a second modification of the construction.

Figure 8 is a sectional view along the line 8—8, Figure 7.

Figure 9 is a perspective view of a preferred form of reenforcing plate utilized in certain of the forms of the invention.

In the trailer body illustrated in Figure 1 the body has been designated generally as 10 and the side wall as 11. Various conventional elements such as the running gear 12 and the prop 13 are shown. These elements form no part of the present invention. The side walls 11 which are preferably formed from laminated plastic are reenforced vertically by the corrugations 14. Upper and lower rub rails designated 15 and 16, respectively, provide horizontal reenforcement and also perform the customary function of protecting the body wall from external contacts. Cross bolsters 17 of bowed configuration depend between the side walls.

The construction at the lower edge of the side walls with which this invention is particularly concerned is best illustrated in Figures 2 and 3. As there shown, the floor 18 is seated directly on the upper surface of the bolster 17 which is of channel configuration and is there secured in position by screws 19 passing through the floor and the upper surface of the bolster. The lower rail element 20 has vertical and horizontal portions, the former being configurated to form the corrugation 16 and the latter being extended beneath the channel-shaped bolster and secured thereto as by welding. As shown in Figure 2, the plastic side wall 11 extends beneath the floor level and to provide a space for the insertion of an extended end 21 of the bolster 17 through this wall and into the corrugation 16 apertures 23 are provided in the lower edge of the side wall at spaced intervals preferably medially between the corrugations. The extended end 21 of the bolster 17 is secured to the inner surface of the corrugation 16 as by welding.

In order to support the lower inner surface of the plastic side wall 11 and to distribute the reenforcement of this surface over a substantial area, plates 24 are disposed directly adjacent the inner wall surface and between the floor 18 and the side wall 11. The plates are then secured to the rail member 20 through the side wall by the rivets 22.

Since the function of the plates 24 is to distribute the support of the inner and lower edge of the side wall it is not essential that they be of the exact configuration shown in Figure 9. However, the form shown in Figure 9 is the preferred form since it provides a complete support over the unreenforced area including the edges of the aperture 23.

When the assembly has been completed the rail element 20 completely covers the apertures 23 and lends a smooth and even appearance to the area as well as providing longitudinal bracing along the length of the body wall.

In Figures 5 and 6 there is illustrated a modification of the invention in which the side wall 25 of the vehicle is formed entirely from laminated plastic sheets reenforced by longitudinal rails or beams. In this form the longitudinal beam 26 is enclosed in the pocket 27 formed between laminations of the plastic and the outer rub rail 28 is similarly enclosed in a corrugation 29 formed longitudinally on the outer surface of the body. The side wall 25 above the beam 26 may have vertical corrugations 30 similar to those utilized in the preferred form of the invention.

In this modified form the bolster 17a terminates laterally at the beam 26 and a channel-shaped member 31 is interposed between the bolster and the beam. This channel member may be extended the entire length of the vehicle body. Attachment members 32 hold the channel member 31 tightly positioned against the inner surface of the side wall 25 above and below the rub rail 29 in the manner illustrated. In this form, if desired, panels 33 of plywood or the like may be disposed on the inner surface of the corrugations 30 and secured to the beam 26 by the screws 34 or similar attachment elements.

The advantage of the form illustrated in Figures 5 and 6 is that it largely dispenses with the use of metal reenforcing elements and provides a body in which the reenforcement and support is provided entirely by the corrugations and reenforcing members disposed therein.

In Figures 7 and 8 there is illustrated a second modification somewhat similar to that illustrated in Figures 1–4. In this modification the side wall 35, preferably formed of laminated plastic sheets, has a reenforcing beam 36 disposed in the pocket 37 formed between the laminations. This beam may be substantially greater in height than it is in width and preferably extends from a point somewhat above the floor line to the lower edge of the rail member 20. This rail member is similar in configuration to that illustrated in the form shown in Figure 2. The side wall preferably includes the vertical corrugations 38 which, as in the case of the form shown in Figures 1 and 2, extend beneath the floor line to the lower edge of the rail member 20. A plate 24 is disposed over the aperture 23 in the same way as previously described and the attachment members 39 passing through the beam 36 secure this plate to the rail member. The bolster 17 is passed through the aperture 23 in the side wall as in the first described form and its extended portion 21 is welded to the inner surface of the corrugation 16.

As illustrated in Figure 9, the plate members 24 preferably have a plurality of pointed projections 40 on their inner surfaces. Since in the forms illustrated in Figures 1–4 and 7–8 these plate members are disposed directly adjacent plastic surfaces, these pointed projections 40 bite into these surfaces and provide an additional degree of securance.

All of the three forms of the invention are characterized by the very substantial degree of reenforcement provided in a body of this type. By the construction proposed the advantages of plastic side wall sheets are fully realized while at the same time any tendency of the sheets to crack or pull under strains is effectively neutralized.

Having described my invention, I claim:

1. In trailer body construction, a side wall substantially formed from a unitary corrugated plastic sheet extending for the entire height of the wall, said sheet having apertures in the lower edge thereof at spaced points along its length, a rail member extending along the lower edge of the wall on the outer surface thereof and concealing the apertures, said rail member having a substantially continuous longitudinal corrugation formed therein and cross bolsters disposed transversely of the trailer body and having their ends inserted through the side wall apertures and secured to the inner surface of the rail member corrugation.

2. In trailer body construction, a side wall substantially formed from a unitary corrugated plastic sheet, said sheet having apertures in the lower edge thereof at spaced points along its length, a rail member extending along the lower edge of the wall on the outer surface thereof and concealing the apertures, cross bolsters disposed transversely of the trailer body and having their ends inserted through the side wall apertures and secured to the inner surface of the rail member, reenforcing plates disposed on the inner surface of the side wall adjacent the lower edge thereof, said plates being secured to the rail member through the wall.

3. In a trailer body a side wall substantially formed from a unitary plastic sheet having vertical corrugations formed therein, filler elements disposed in the corrugations and apertures formed in the lower edge of the sheet in the areas between the corrugations, a rail member extending along the lower edge of the side wall on the outer surface thereof and concealing the apertures, cross bolsters disposed transversely of the trailer body and having their ends secured to the inner surface of the rail member, reenforcing plates positioned on the inner surface of the side wall adjacent the apertures and attachment means for securing the plates to the rail member through the side wall.

4. In a trailer body a side wall substantially formed from a unitary plastic sheet having vertical corrugations formed therein and apertures formed in the lower edge of the sheet in the areas between the corrugations, a rail member extending along the lower edge of the side wall on the outer surface thereof and concealing the apertures, cross bolsters disposed transversely of the trailer body and having their ends secured to the inner surface of the rail member, reenforcing plates positioned on the inner surface of the side wall adjacent the apertures, said plates having pointed projections on the surface adjacent the wall for engagement therewith and attachment means for securing the plates to the rail member through the wall.

5. In a body for trailers or the like a side wall substantially formed from a laminated plastic sheet, a longitudinal beam member disposed between the laminations of the plastic adjacent the lower edge of the wall, said wall having apertures formed in the lower edge thereof at spaced points, a rail member disposed on the outer surface of the wall along the lower edge thereof and concealing the apertures, cross bolsters extending transversely of the body, said cross bolsters having their ends extended through the body wall apertures and secured to the outer rail member, reenforcing plates positioned on the inner surface of the body wall adjacent the apertures, and attachment means securing the plates to the outer rail member through the beam.

JAMES J. BLACK.

REFERENCES CITED

The following references are of record in the file of this patent:

UNITED STATES PATENTS

| Number | Name | Date |
| --- | --- | --- |
| 408,611 | Garrett | Aug. 6, 1889 |
| 470,326 | Burton | Mar. 8, 1892 |
| 688,180 | Kling | Dec. 3, 1901 |
| 1,414,419 | Kemp et al. | May 2, 1922 |
| 1,530,570 | Moores et al. | Mar. 24, 1925 |
| 1,814,556 | Jewett, Jr. | July 14, 1931 |
| 2,022,869 | Reid | Dec. 3, 1935 |
| 2,029,756 | Davis, Jr. | Feb. 4, 1936 |
| 2,363,170 | Fontaine | Nov. 21, 1944 |
| 2,400,253 | Ostlund | May 14, 1946 |

FOREIGN PATENTS

| Number | Country | Date |
| --- | --- | --- |
| 285,743 | Great Britain | Feb. 23, 1928 |
| 379,379 | Germany | Aug. 20, 1923 |